(12) United States Patent
Senepart

(10) Patent No.: US 6,739,549 B2
(45) Date of Patent: May 25, 2004

(54) DIRIGIBLE BALLOON RIGIDIFIED BY HELIUM TANKS

(75) Inventor: Marc Senepart, Laloubere (FR)

(73) Assignee: Aerospace Adour Technology, Pau (FR)

( * ) Notice: Subject to any disclaimer, the term of this patent is extended or adjusted under 35 U.S.C. 154(b) by 0 days.

(21) Appl. No.: 10/276,021

(22) PCT Filed: May 11, 2001

(86) PCT No.: PCT/FR01/01421
§ 371 (c)(1),
(2), (4) Date: Nov. 12, 2002

(87) PCT Pub. No.: WO01/85540
PCT Pub. Date: Nov. 15, 2001

(65) Prior Publication Data
US 2003/0141410 A1 Jul. 31, 2003

(30) Foreign Application Priority Data
May 12, 2000 (FR) .............................................. 00 06179

(51) Int. Cl.⁷ ................................................. B64B 1/02
(52) U.S. Cl. .............................. 244/24; 244/30; 244/31; 244/128

(58) Field of Search ............................... 244/24, 29, 30, 244/31, 5, 128

(56) References Cited

U.S. PATENT DOCUMENTS

| 1,900,743 | A | | 3/1933 | Strobl | 244/24 |
|---|---|---|---|---|---|
| 3,032,298 | A | * | 5/1962 | Callahan | 244/119 |
| 3,443,776 | A | * | 5/1969 | Moore | 244/5 |
| 3,559,920 | A | * | 2/1971 | Moore | 244/5 |
| 4,052,025 | A | * | 10/1977 | Clark et al. | 244/25 |
| 5,005,783 | A | * | 4/1991 | Taylor | 244/97 |

FOREIGN PATENT DOCUMENTS

FR          407 385 A       2/1910

\* cited by examiner

Primary Examiner—J. Woodrow Eldred
(74) Attorney, Agent, or Firm—Weingarten, Schurgin, Gagnebin & Lebovici LLP

(57) ABSTRACT

A variable-lift device using a helium to fly. The device comprises a balloon (1) composed of an outer flexible envelope (3) supported by a rigid structure. The rigid structure comprises a plurality of hollow toruses (4) of inside volume that acts as a tank for storing helium under pressure.

7 Claims, 2 Drawing Sheets

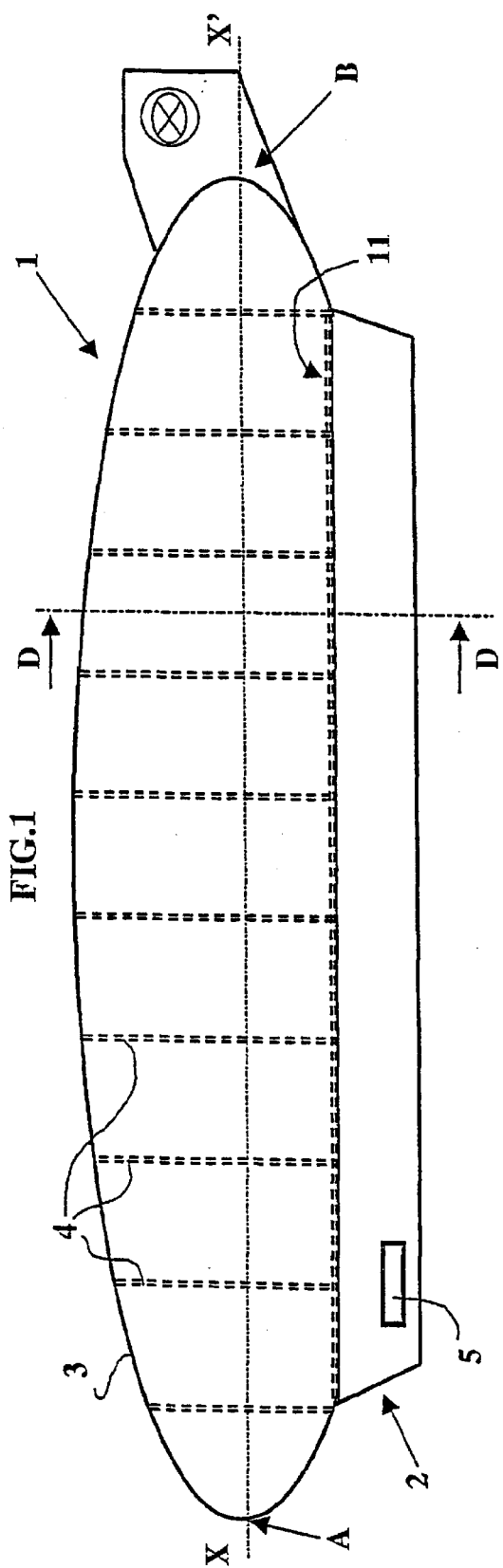
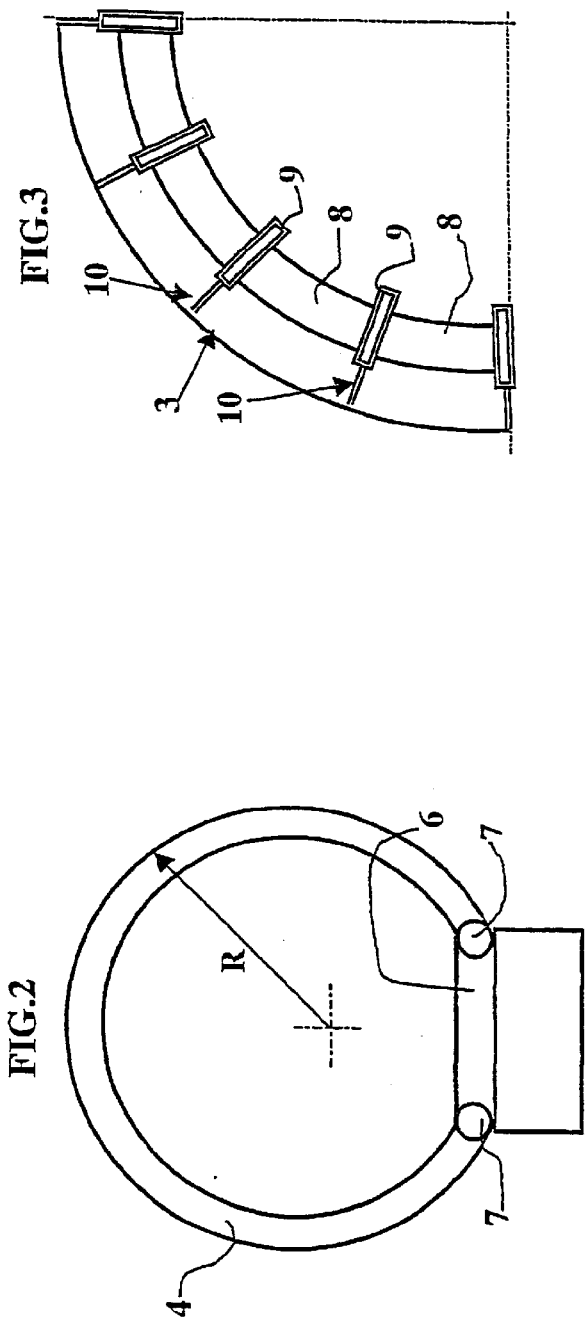

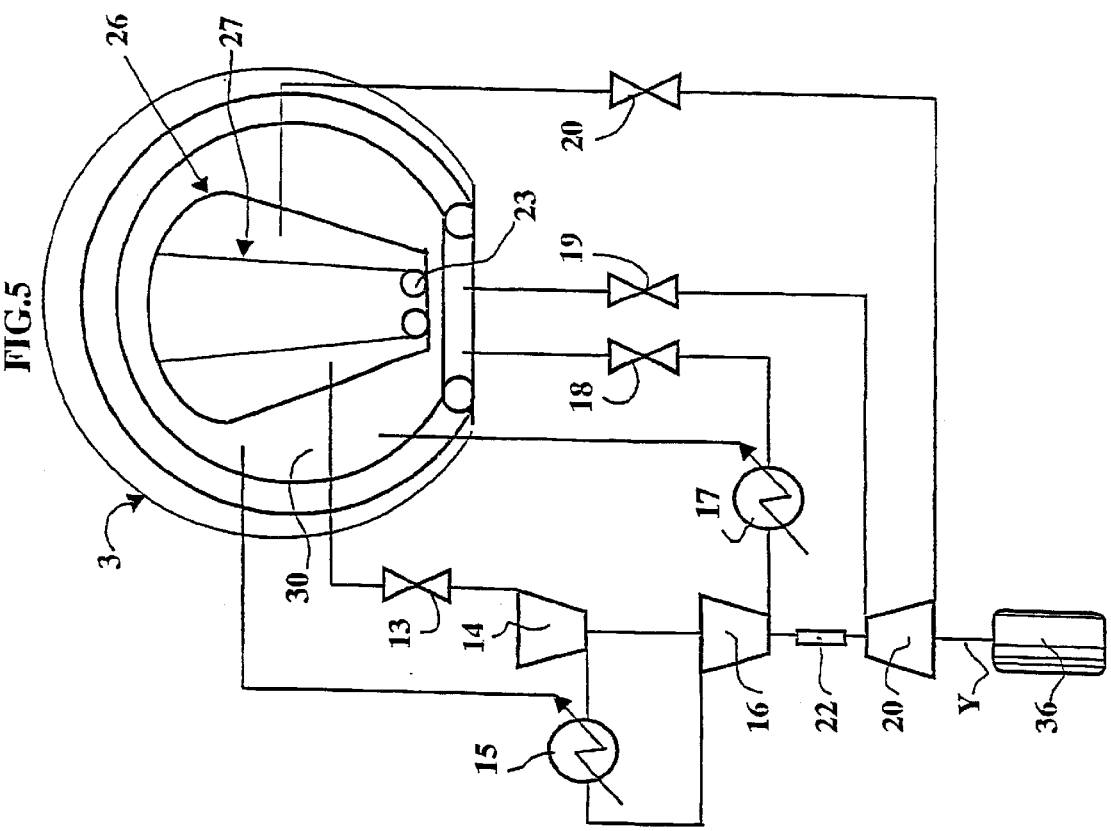
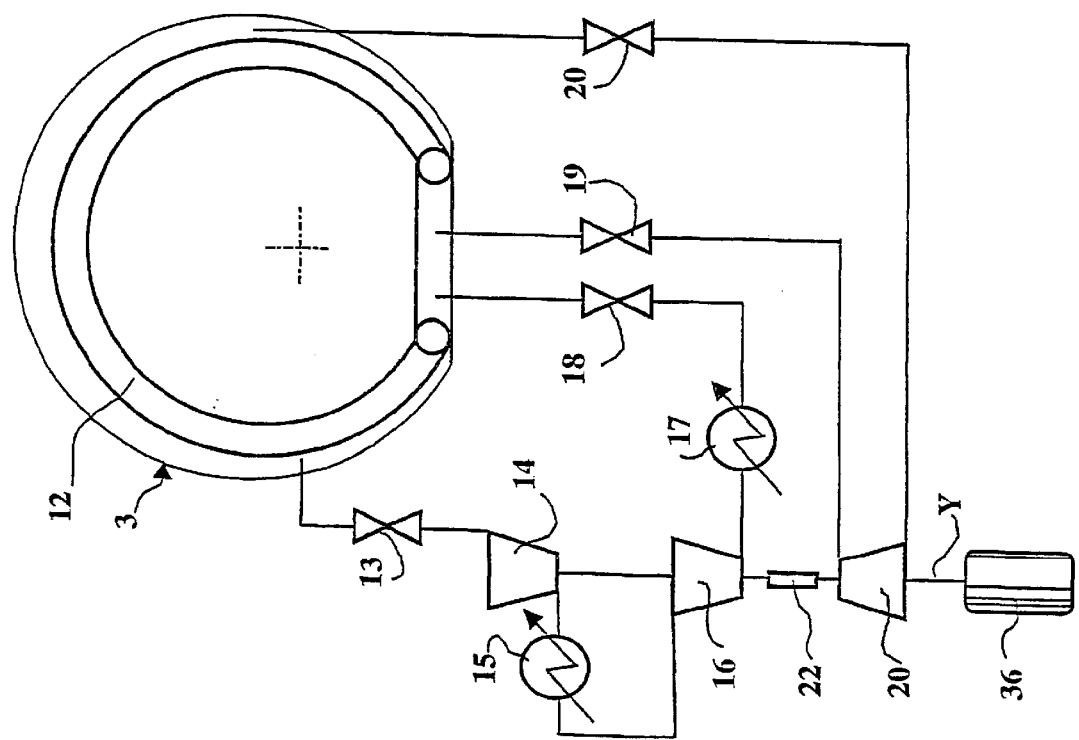

DIRIGIBLE BALLOON RIGIDIFIED BY HELIUM TANKS

The present invention relates to the field of variable-lift devices using a gas that is lighter than air for rising in the atmosphere. More precisely, the invention relates to variable-lift devices provided with a tank for storing the lighter-than-air gas under pressure, such as helium, neon, methane, ethane, or hydrogen.

A variable-lift device can be used for moving or lifting heavy objects or objects of sizes that are too bulky for them to be transported by truck, train, or airplane.

In general, variable-lift devices are constituted by a balloon containing helium and a gondola attached to the balloon. The gondola contains various accessories needed for navigation. The balloon is constituted by a flexible envelope supported by a rigid structure. The rigid structure consists of an assembly of beams, a beam being an element that is long in one dimension relative to the other two dimensions. The shape the rigid structure gives to the flexible envelope is selected so as to be aerodynamic.

In the prior art, the gondola attached to the balloon contains the helium tanks, together with other accessories. The shape of the helium tank is selected so as to store a large quantity of helium while reducing the size and the weight of the tanks.

The present invention proposes making use of hollow beams to constitute at least a portion of the rigid structure which supports the flexible envelope constituting the balloon, and to store helium under pressure inside the hollow beams.

The present invention provides a variable-lift device using a gas that is lighter than air, the device comprising an outer envelope supported by a more rigid structure, the device being characterized in that said structure comprises a hollow beam having internal volume that is used as a tank for storing said gas. The hollow beam may be covered in a cloth that is leakproof relative to said gas and that thermally insulates the internal volume of the hollow beam. The hollow beam may be a hollow torus. The hollow torus may comprise at least two torus portions assembled together.

In a first variant of the invention, the structure of the device comprises at least two hollow toruses whose internal volumes are in communication. In a second variant of the invention, the structure of the device comprise at least two hollow toruses whose inside volumes are not in communication.

The present invention provides a saving in weight and reduces the space occupied in the gondola since the helium tank and the rigid structure are one and the same element.

Other advantages and characteristics of the invention will appear on reading an embodiment of the invention as illustrated in the accompanying drawings, in which:

FIG. 1 shows a variable-lift device;

FIG. 2 is a cross-section about the axis X—X' of FIG. 1;

FIG. 3 shows a detail of a portion of the rigid structure of the dirigible balloon; and FIG. 4 is a diagram showing details of the operation of a variable-lift device.

FIG. 5 illustrates a method of operation related to a dirigible balloon.

FIG. 1 shows a dirigible balloon constituted by a gondola 2 attached to a balloon 1. The balloon 1 is substantially in the shape of a (rugby) football. I.e. the shape of the balloon 1 is the result of rotating a curve about the axis X—X', the curve intersecting the axis X—X' at two points A and B. In general, the dirigible balloon travels along the horizontal axis X—X'.

The gondola 2 situated beneath the dirigible balloon contains at least the drive unit 5 which drives the helium compressors.

The balloon 1 is composed of a rigid structure on which a flexible envelope rests. Toruses 4 constitute the main elements of the rigid structure. The toruses 4 are tubes of axes substantially in the form of a circle of radius R contained in a plane. The toruses are disposed perpendicularly to the axis X—X'.

The toruses 4 are hollow and constitute the tanks of helium under pressure. The toruses may be tubes of steel that have been axially deformed into a circle. As can be seen in FIG. 3, the toruses 4 may also be constituted by torus portions 8 that are assembled together by small tubes or ferrules 9. The geometry of a hollow torus is very favorable, firstly for withstanding internal pressure, and secondly for withstanding stresses coming from the outside. This means firstly that a tank in the form of a torus can contain, relative to its own weight, a large quantity of fluid under pressure, and secondly that a beam in the form of a torus presents, relative to its own weight, great stiffness against forces such as bending, traction, compression, and twisting.

From FIG. 2, it can be seen that each torus 4 has a flat 6 in its bottom portion. The inside volumes of the various toruses 4 communicate via tubes 7 of axes substantially parallel to the axis X—X'. The tubes 7 may be situated level with the flats 6 of the toruses 4. As shown in FIG. 1, the tubes 7 may constitute a beam 11 that is substantially parallel to the axis X—X' and that interconnects all of the toruses. To keep the dirigible balloon in equilibrium, two beams 11 are used that are disposed symmetrically about the position of the flats 6 and about the shape of the balloon 1. The tubes 7 may establish connection between all of the inside volumes of the toruses 4 so as to constitute a single tank. It is also possible for the tubes 7 to provide a plurality of tanks each constituted by a plurality of toruses 4 but with each tank being independent of the others. The tubes 7 in the form of beams 11 and flats 6 may be used as supports for securing the gondola 2 to the balloon 1.

The toruses 4, their flats 6, and the tubes 7 are cloth-covered to provide leakproofing and thermal insulation. The cloth may be a laminate comprising a plurality of layers including a layer of polyethylene, a layer reinforced by fibers such as carbon fibers, and an outer aluminized layer.

Beams 10 shown in FIG. 3 and referred to as "stringers" interconnect the toruses mechanically. The stringers 10 may be rectangular in section or they may be of I-section, and they may be made of aluminum, of wood, or of resin filled with reinforcing fibers. In general, the stringers 10 extend perpendicularly to the toruses so that the entire rigid structure constituted by the toruses 4 and the stringers 10 constitutes gridding over the entire surface of the balloon 1. As shown in FIG. 2, the stringers 10 can be fixed to the ferrules 9, or to any other portion of the toruses 4. The stringers 10 hold the toruses in defined positions relative to one another.

The rigid structure made up of the toruses 4 and the stringers 10 forms a gridded surface on which the flexible envelope 3 is placed. The flexible envelope 3 is fixed mainly to the stringers 10.

In the dirigible balloon configuration shown in FIGS. 3 and 4, the flexible envelope 3 can itself contain the helium. In another dirigible balloon configuration, shown in FIG. 5, the helium is contained in one or more internal flexible envelopes 26, themselves contained inside the flexible envelope 3.

The operation of a variable-lift device of the invention is described in detail with reference to FIG. 4.

When navigation maneuvers require the quantity of helium in the inside volume of the envelope 3 to be reduced, helium is taken from the inside volume of the envelope 3 so as to be compressed and stored in the tank. The inside volume of the envelope 3 communicates via a valve 13 with a compressor 14 which delivers helium under pressure P1 and temperature T1 into a heat exchanger 15. Fresh air flowing through the heat exchanger 15 cools the helium indirectly, i.e. without coming into contact therewith, to a temperature T2. On leaving the heat exchanger 15, the helium is compressed to a pressure P2 and a temperature T3 by a compressor 16. Thereafter the helium is cooled in an indirect heat exchanger 17 prior to being introduced into a tank 12 constituted by a plurality of toruses 4 interconnected by tubes 7. Like the heat exchanger 15, the heat exchanger 17 also uses air as the cooling fluid. A valve 18 secures communication between the outlet of the heat exchanger 17 and the tank 12.

When navigation maneuvers require the quantity of helium in the inside volume of the envelope 3 to be increased, then helium is taken from the tanks 12 and is introduced into the inside volume of the envelope 3. The helium contained in the tank 12 may be expanded in a turbine 20 prior to being introduced into the inside volume of the envelope 3. The valve 19 controls opening of the tank 12 to the turbine 20, and a valve 21 controls opening of the envelope 3 to the turbine 20.

A motor 36 rotates a shaft Y having the compressors 14 and 16 and the turbine 20 mounted thereon. A clutch 22 mounted on the shaft Y allows the compressors 14 and 16 to be decoupled from the motor 36 and the turbine 20. Thus, the work delivered by the helium expanding through the turbine 20 is recovered by the shaft Y, e.g. by means of a proportional torque drive so as to increase the power of the motor 36.

The heat exchangers are essential in order to perform polytropic compression of helium. This optimizes compression efficiency. Furthermore, by limiting the temperature rise of the helium, the members that come into contact with the helium are protected from damage due to the effect of high temperature.

The method of operation shown in FIG. 5 relates to a dirigible balloon having an envelope 3 containing one or more envelopes 26 themselves containing helium. The shape of the envelope 3 is determined by the rigid structure constituted in particular by the toruses 4. The shape of the volume of the envelope 26 are independent of the shape of the envelope 3 and are modifiable by a set of cables 7. One or more winches 23 enable the lengths of the cables 27 to be modified.

By reducing the lengths of the cables 27, the inside volume of the envelope 26 is reduced. Air enters via the heat exchanger 15 to occupy the space 30 between the envelope 3 and the envelope 26. The apparent weight of the dirigible balloon in air increases because of the reduction in the volume of helium.

What is claimed is:

1. A variable-lift device using a gas that is lighter than air, the device comprising an outer envelope supported by a more rigid structure, the device being characterized in that said structure comprises a hollow torus having an inside volume that acts as a tank for storing said gas.

2. A device according to claim 1, characterized in that said hollow beam is covered in a cloth that is leakproof relative to said gas and that thermally insulates the inside volume of the hollow beam.

3. A device according to claim 1, characterized in that said hollow torus comprises at least two assembled-together torus positions.

4. A device according to claim 1, characterized in that said structure comprises at least two hollow toruses having inside volumes in communication.

5. A device according to claim 1, characterized in that said structure comprises at least two hollow toruses having inside volumes that are not in communication.

6. A device according to claim 2, characterized in that said hollow beam is a hollow torus.

7. A device according to claim 4, characterized in that said structure comprises at least two hollow toruses having inside volumes that are not in communication.

\* \* \* \* \*